US012021243B2

(12) United States Patent
Hasegawa et al.

(10) Patent No.: US 12,021,243 B2
(45) Date of Patent: Jun. 25, 2024

(54) SULFIDE ALL-SOLID-STATE BATTERY

(71) Applicants: Toyota Jidosha Kabushiki Kaisha, Toyota (JP); Toyo Kohan Co., Ltd., Kudamatsu (JP)

(72) Inventors: Hajime Hasegawa, Aichi-ken (JP); Shigetaka Nagamatsu, Nagoya (JP); Shinichirou Horie, Kudamatsu (JP); Koh Yoshioka, Kudamatsu (JP); Toshifumi Koyanagi, Kudamatsu (JP); Etsuro Tsutsumi, Kudamatsu (JP); Michio Kawamura, Kudamatsu (JP); Yuma Yoshizaki, Kudamatsu (JP)

(73) Assignees: TOYOTA JIDOSHA KABUSHIKI KAISHA, Toyota (JP); TOYO KOHAN CO., LTD., Kudamatsu (JP)

( * ) Notice: Subject to any disclaimer, the term of this patent is extended or adjusted under 35 U.S.C. 154(b) by 120 days.

(21) Appl. No.: 17/375,519

(22) Filed: Jul. 14, 2021

(65) Prior Publication Data

US 2022/0021000 A1 Jan. 20, 2022

(30) Foreign Application Priority Data

Jul. 16, 2020 (JP) ................................ 2020-122130

(51) Int. Cl.

*H01M 4/66* (2006.01)
*H01M 4/36* (2006.01)
*H01M 10/0562* (2010.01)

(52) U.S. Cl.

CPC ........... *H01M 4/661* (2013.01); *H01M 4/364* (2013.01); *H01M 4/666* (2013.01); *H01M 10/0562* (2013.01)

(58) Field of Classification Search

CPC ...... H01M 4/661; H01M 4/666; H01M 4/364; H01M 10/0562

See application file for complete search history.

(56) References Cited

U.S. PATENT DOCUMENTS

2011/0192451 A1* 8/2011 Sato .................. H01L 31/03925 257/632
2015/0349378 A1* 12/2015 Ose ....................... H01M 4/139 29/623.1

(Continued)

FOREIGN PATENT DOCUMENTS

JP H06310147 A 11/1994
JP H07335206 A 12/1995

(Continued)

*Primary Examiner* — Christopher P Domone
*Assistant Examiner* — Jonathan William Estes
(74) *Attorney, Agent, or Firm* — Dinsmore & Shohl LLP

(57) ABSTRACT

Provided is a sulfide all-solid battery having an anode current collector of powerful adhesiveness which is difficult to be sulfurized. The sulfide all-solid-state battery including: a cathode layer; an anode layer; and a sulfide solid electrolyte layer disposed between the cathode layer and the anode layer, wherein the anode layer has an anode mixture layer, and an anode current collector on a face of the anode mixture layer, the face being on an opposite side of the sulfide solid electrolyte layer, the anode current collector is electrolytic iron foil that does not substantially contain other elements, and the anode current collector has surface roughness Ra of 0.2 μm to 0.6 μm, and surface roughness Rz of 2 μm to 6 μm.

3 Claims, 2 Drawing Sheets

100

(56) References Cited

U.S. PATENT DOCUMENTS

| | | | | |
|---|---|---|---|---|
| 2018/0062199 | A1 * | 3/2018 | Kim | H01M 10/0562 |
| 2020/0227757 | A1 * | 7/2020 | Imai | H01M 4/1395 |
| 2020/0313161 | A1 | 10/2020 | Isojima et al. | |

FOREIGN PATENT DOCUMENTS

| | | | | | |
|---|---|---|---|---|---|
| JP | 2964833 | B2 | * | 10/1999 | |
| JP | 2002-083578 | A | | 3/2002 | |
| JP | 2002-260637 | A | | 9/2002 | |
| JP | 2015-005421 | A | | 1/2015 | |
| JP | 2015005421 | A | * | 1/2015 | |
| JP | 2018-045779 | A | | 3/2018 | |
| JP | 2018045779 | A | * | 3/2018 | |
| WO | 2019/078093 | A1 | | 4/2019 | |
| WO | WO-2019078093 | A1 | * | 4/2019 | H01M 10/0463 |
| WO | 2019/151372 | A1 | | 8/2019 | |
| WO | WO-2019151372 | A1 | * | 8/2019 | H01M 10/052 |

* cited by examiner

SULFIDE ALL-SOLID-STATE BATTERY

CROSS-REFERENCE TO RELATED APPLICATIONS

This application is based upon and claims the benefit of priority of Japanese Patent Application No. 2020-122130, filed on Jul. 16, 2020, the entire contents of which are incorporated herein by reference.

TECHNICAL FIELD

The present application relates to a sulfide all-solid-state battery.

BACKGROUND

In the field of lithium ion batteries, a lithium ion battery using a solid electrolyte has been developed in view of promoting safety. It has been considered to use a sulfide solid electrolyte as the solid electrolyte in view of increasing power.

SUMMARY

Technical Problem

Generally, all-solid-state batteries are manufactured by pressing at a very high pressure from the point of view that particles in each electrode layer are brought into contact with each other to secure the battery performance. However, using, for example, metal foil made from Cu or the like as a current collector when a sulfide solid electrolyte is used as the solid electrolyte results in reaction of the current collector and the sulfide solid electrolyte with each other to sulfurize the current collector, which may cause short circuits in an electrode.

With the foregoing actual circumstances in view, an object of the present application is to provide a sulfide all-solid battery having an anode current collector of powerful adhesiveness which is difficult to be sulfurized.

Solution to Problem

In order to solve such a problem, the inventors of the present application have focused on electrolytic iron that is difficult to be sulfurized by a sulfide solid electrolyte. Electrolytic iron is used for current collectors, exterior packing of batteries, etc. in a battery field because relatively inexpensive (JP H6-310147 A, JP 2002-83578 A, and JP H7-335206 A).

For example, JP H6-310147 A discloses a lithium secondary battery using electrolytic iron foil having a thickness of at most 35 microns as an anode current collector in view of reducing the cost of raw materials. JP H6-310147 A describes a lithium secondary battery using a nonaqueous electrolytic solution as an electrolyte, as the main embodiment. JP H6-310147 A also describes an embodiment using a solid electrolyte, wherein any solid electrolyte may be used as long as being an insulating and lithium-ion conductive solid electrolyte.

However, JP H6-310147 A does not focus on the adhesiveness between the electrolytic iron foil and the solid electrolyte. As described later, the inventors of the present application have found that all electrolytic iron foil does not always adhere to a sulfide solid electrolyte. The lithium secondary battery using a nonaqueous electrolytic solution as an electrolyte is the main embodiment in JP H6-310147 A. Thus, the adhesiveness between the electrode and the current collector after pressing is not considered because such an embodiment does not need a high press pressure unlike all-solid-state batteries, and since affecting the performance merely a little.

The inventors of the present application have considered adhesiveness between electrolytic iron foil and solid electrolytes, and have found that strict adjustment of surface roughness and surface hardness of electrolytic iron foil improves the adhesiveness to the electrode layer. Based on the findings, the inventors completed a sulfide all-solid-state battery according to the present disclosure. Hereinafter the sulfide all-solid-state battery according to the present disclosure will be described.

As one aspect for solving the above problem, the present application discloses a sulfide all-solid-state battery comprising: a cathode layer; an anode layer; and a sulfide solid electrolyte layer disposed between the cathode layer and the anode layer, wherein the anode layer has an anode mixture layer, and an anode current collector on a face of the anode mixture layer, the face being on an opposite side of the sulfide solid electrolyte layer, the anode current collector is electrolytic iron foil that does not substantially contain other elements, and the anode current collector has surface roughness Ra of 0.2 μm to 0.6 μm, and surface roughness Rz of 2 μm to 6 μm.

In some embodiments, the sulfide all-solid-state battery, an elongation percentage of the anode current collector is 5% to 12%, and the anode current collector has surface hardness of 1090 to 2050.

As one aspect for solving the above problem, the present application also discloses a sulfide all-solid-state battery comprising: a cathode layer; an anode layer; and a sulfide solid electrolyte layer disposed between the cathode layer and the anode layer, wherein the anode layer has an anode mixture layer, and an anode current collector on a face of the anode mixture layer, the face being on an opposite side of the sulfide solid electrolyte layer, the anode current collector is electrolytic iron foil that does not substantially contain other elements, and the anode current collector has surface hardness of 1090 to 2050.

As one aspect for solving the above problem, the present application further discloses a sulfide all-solid-state battery comprising: a cathode layer; an anode layer; and a sulfide solid electrolyte layer disposed between the cathode layer and the anode layer, wherein the anode layer has an anode mixture layer, and an anode current collector on a face of the anode mixture layer, the face being on an opposite side of the sulfide solid electrolyte layer, the anode current collector is electrolytic iron foil that does not substantially contain other elements, a surface of the anode current collector being Ni-plated, and the anode current collector has surface roughness Ra of 0.55 μm to 0.75 μm, and surface roughness Rz of 5 μm to 8 μm.

Effects

The sulfide all-solid-state battery according to the present disclosure, which uses electrolytic iron foil that does not substantially contain any other element as an anode current collector, can suppress sulfurization of the anode current collector due to a sulfide solid electrolyte, to suppress short circuits inside an electrode. Further, adjustment of properties of the anode current collector to be within predetermined ranges can improve the adhesiveness to an anode mixture layer. The improved adhesiveness between the anode current collector and the anode mixture layer can reduce the internal resistance of the sulfide all-solid-state battery.

DETAILED DESCRIPTION OF EMBODIMENTS

In the present description, expression "A to B" concerning numeral values A and B shall mean "at least A and at most B". In such expression, if a unit is added only to the numeral value B, this unit shall be applied to the numeral value A as well.

[Sulfide all-Solid-State Battery 100]

Figure 1:
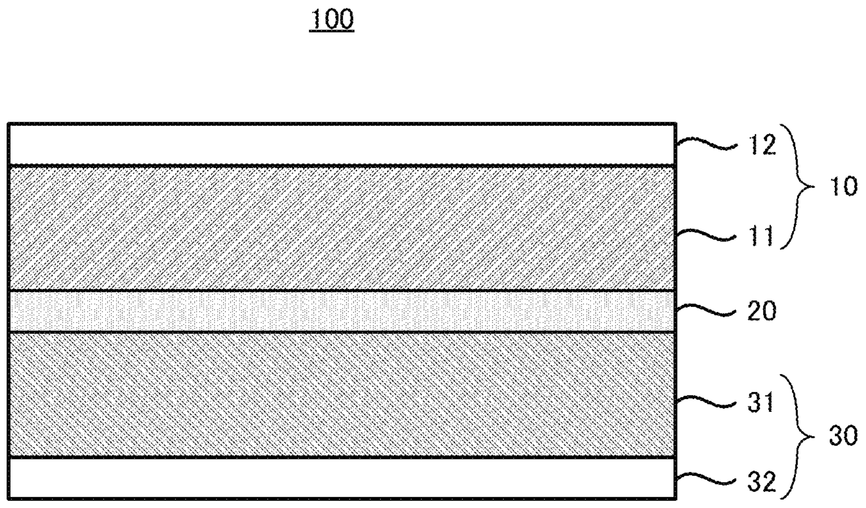
FIG. 1 is a schematic cross-sectional view of a sulfide all-solid-state battery 100.

A sulfide all-solid-state battery according to the present disclosure will be described using a sulfide all-solid-state battery 100 that is one embodiment. FIG. 1 is a schematic cross-sectional view of the sulfide all-solid-state battery 100. As in FIG. 1, the sulfide all-solid-state battery 100 includes a cathode layer 10, an anode layer 30, and a sulfide solid electrolyte layer 20 that is disposed between the cathode layer 10 and the anode layer 30. It is not shown in FIG. 1, but in the sulfide all-solid-state battery 100, other layers such as a protective layer may be further layered.

(Cathode Layer 10)

The cathode layer 10 includes a cathode mixture layer 11 and a cathode current collector 12. The cathode current collector 12 is disposed on a face of the cathode mixture layer 11 which is on the opposite side of the sulfide solid electrolyte layer 20.

The cathode mixture layer 11 at least contains a cathode active material. The cathode mixture layer 11 may optionally contain a solid electrolyte, a binder, a conductive additive, and the like.

The cathode active material is not particularly limited as long as being a cathode active material used in a lithium secondary battery. For example, the cathode active material may be lithium cobaltate ($LiCoO_2$), lithium nickelate ($LiNiO_2$), lithium manganate ($LiMn_2O_4$), $LiCo_{1/3}Ni_{1/3}Mn_{1/3}O_2$, or a different kind element substituent Li—Mn spinel having any composition represented by $Li_{1+x}Mn_{2-x-y}M_yO_4$ (M is at least one metallic element selected from Al, Mg, Co, Fe, Ni and Zn).

The cathode active material may have a coat layer on a surface thereof. The material of the coat layer is not particularly limited as long as having lithium-ion conductivity and being capable of maintaining a morphology thereof so that the material is not fluidized even if in contact with the active material or the solid electrolyte. Examples thereof include $LiNiO_3$, $Li_4Ti_5O_{12}$ and $Li_3PO_4$. Such a coat layer may be formed on the surface of the cathode active material by, for example, a tumbling fluidized coating machine.

The solid electrolyte is not particularly limited as long as being a solid electrolyte that may be used in a lithium secondary battery. For example, the solid electrolyte may be an oxide solid electrolyte, and may be a sulfide solid electrolyte. Examples of the oxide solid electrolyte include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$ and $Li_{3+x}PO_{4-x}N_x$ (LiPON). Examples of the sulfide solid electrolyte include $Li_2S$—$SiS_2$, LiI—$Li_2S$—$SiS_2$, LiI—$Li_2S$—$P_2S_5$, LiI—LiBr—$Li_2S$—$P_2S_5$, LiI—$Li_2S$—$P_2O_5$, LiI—$Li_3PO_4$—$P_2S_5$ and $Li_2S$—$P_2S_5$.

The binder is not particularly limited as long as being a binder that may be used in a lithium secondary battery. For example, the binder may be a material such as polyvinylidene fluoride (PVdF), carboxymethyl cellulose (CMC), butadiene rubber (BR) and styrene-butadiene rubber (SBR), or any combination thereof.

The conductive additive is not particularly limited as long as being a conductive additive that may be used in a lithium secondary battery. For example, the conductive additive may be a carbon material such as VGCF (Vapor Grown Carbon Fibers) and carbon nanofibers, a metallic material, or the like.

The content of each component in the cathode mixture layer 11 may be the same as the conventional. For example, the content of the cathode active material in the cathode mixture layer 11 may be 10 wt % to 99 wt %. The shape of the cathode mixture layer 11 may be also the same as the conventional. From the point of view that the sulfide all-solid-state battery 100 can be easily formed, the cathode mixture layer 11 is in the form of a sheet. In this case, the thickness of the cathode mixture layer 11 may be, for example, 0.1 μm to 1 mm.

The cathode current collector 12 is not particularly limited as long as being a cathode current collector that may be used in a lithium secondary battery. Examples thereof include SUS, Ni, Cr, Au, Pt, Al, Fe, Ti and Zn.

A known method may be used as the method of manufacturing the cathode layer 10. For example, the cathode layer 10 may be formed by dispersing the material to constitute the cathode mixture layer 11 in an organic dispersion medium to form a slurry, and applying the slurry onto the cathode current collector 12 to dry. Alternatively, the cathode layer 10 may be formed by mixing the material to constitute the cathode mixture layer 11 in a dry condition, and, for example, press-molding the mixed mixture on the cathode current collector 12.

(Sulfide Solid Electrolyte Layer 20)

The sulfide solid electrolyte layer 20 at least contains a sulfide solid electrolyte. The sulfide solid electrolyte layer 20 may optionally contain a binder etc. The sulfide solid electrolyte is not particularly limited as long as being a sulfide solid electrolyte that may be used in a lithium secondary battery. For example, the above described sulfide solid electrolyte may be used. The binder is not particularly limited as long as being a binder that may be used in a lithium secondary battery. For example, the above described binder may be used. The content of each component in the sulfide solid electrolyte layer may be the same as the conventional. The shape of the sulfide solid electrolyte layer may be also the same as the conventional. From the point of view that the sulfide all-solid-state battery 100 can be easily formed, the sulfide solid electrolyte layer 20 is in the form of a sheet. In this case, the thickness of the sulfide solid electrolyte layer 20 may be, for example, 0.1 μm to 1 mm.

A known method may be used as the method of manufacturing the sulfide solid electrolyte layer 20. For example, the sulfide solid electrolyte layer 20 may be manufactured by using the same method as that for the cathode layer 10 described above.

(Anode Layer 30)

The anode layer 30 includes an anode mixture layer 31 and an anode current collector 32. The anode current collector 32 is included on a face of the anode mixture layer 31 which is on the opposite side of the sulfide solid electrolyte layer 20.

The anode mixture layer 31 contains an anode active material and a sulfide solid electrolyte, and may optionally contain other solid electrolytes, a binder, and a conductive additive.

The anode active material is not particularly limited as long as being an anode active material that may be used in a lithium secondary battery. Examples thereof include carbon materials such as graphite and hard carbon, Si or Si alloys, lithium titanate ($Li_2TiO_3$), $TiNbO_7$, and NbWO-based anode active materials.

The sulfide solid electrolyte is not particularly limited as long as being a sulfide solid electrolyte that may be used in a lithium secondary battery. For example, the above described sulfide solid electrolyte may be used. Examples of the other solid electrolytes include oxide solid electrolytes. The oxide solid electrolytes are not particularly limited as long as being oxide solid electrolytes that may be used in a lithium secondary battery. For example, the above described oxide solid electrolyte may be used. The binder is not particularly limited as long as being a binder that may be used in a lithium secondary battery. For example, the above described binder may be used. The conductive additive is not particularly limited as long as being a conductive additive that may be used in a lithium secondary battery. For example, the above described conductive additive may be used.

The content of each component in the anode mixture layer 31 may be the same as the conventional. For example, the content of the anode active material in the anode mixture layer 31 may be 10 wt % to 99 wt %. The shape of the anode mixture layer 31 may be also the same as the conventional. From the point of view that the sulfide all-solid-state battery 100 can be easily formed, the anode mixture layer 31 is in the form of a sheet. In this case, the thickness of the anode mixture layer 31 may be, for example, 0.1 μm to 1 mm.

The anode current collector 32 is electrolytic iron foil that does not substantially contain any other element, or electrolytic iron foil that does not substantially contain any other element and a surface thereof is Ni-plated. Hereinafter "electrolytic iron foil that does not substantially contain any other element" may be simply referred to as "electrolytic iron foil".

"Electrolytic iron foil that does not substantially contain any other element" means electrolytic iron foil of pure iron, which encompasses electrolytic iron foil including an element other than iron if the inclusion is due to manufacturing errors and the like, and the content thereof is extremely low so that the influence thereof is negligible. In some embodiments, the iron purity (content) of the electrolytic iron foil is at least 99.9%, at least 99.95%, or at least 99.97%. Since iron is hardly sulfurized by a sulfide solid electrolyte, a higher content of iron in the electrolytic iron foil can more suppress short circuits inside an electrode.

"A surface . . . is Ni-plated" means that at least a face of the anode current collector 32 which is in contact with the anode mixture layer 31 is Ni-plated. Both faces of the electrolytic iron foil may be Ni-plated. Ni-plating the electrolytic iron foil can give content resistance, and a primary rust resistance function during transportation and storage. Further, controlling the plating conditions can lead to a rougher surface than the electrolytic iron foil. In some embodiments, the thickness of the anode current collector 32 is not particularly limited, but is 10 μm to 15 μm.

When the anode current collector 32 is electrolytic iron foil, the anode current collector 32 shall be such that (1) surface roughness Ra is 0.2 μm to 0.6 μm, and surface roughness Rz is 2 μm to 6 μm, or (2) surface hardness is 1090 to 2820.

In the case (1), where the surface roughness of the anode current collector 32 is within the above ranges, the elongation percentage is 5 to 12%, or 5 to 7%. In some embodiments, the surface hardness is 1090 to 2820, or 1090 to 2050.

In the case (1) of the anode current collector 32, the surface roughness of the anode current collector 32 within the above ranges can improve the adhesiveness between the anode current collector 32 and the anode mixture layer 31 even in the case of electrodes of an all-solid battery that need a high press pressure in manufacturing. The improved adhesiveness can reduce the internal resistance of the sulfide all-solid-state battery. The elongation percentage of the anode current collector 32 within the above range makes it possible to adhere the anode current collector 32 and the anode mixture layer 31 to each other even at a relatively low press pressure (e.g., 25 kN/cm). Usually, lowering a press pressure reduces bite of the anode current collector 32 into the anode mixture layer 31, so that pressing results in the difference between the elongation of the anode mixture layer 31 and the elongation of the anode current collector 32, which easily leads to separation. The elongation percentage within the above described range results in proper adhesion, which makes the separation difficult. Furthermore, the surface hardness of the anode current collector 32 within the above range can reduce the internal resistance of the battery. This is considered to be because bite of the anode mixture layer 31 into the anode current collector 32 becomes easy, so that the contact area of the anode mixture layer 31 and the anode current collector 32 enlarges.

In the case (2), where the surface hardness of the anode current collector 32 is within the above range, the anode current collector 32 and the anode mixture layer 31 can be adhered to each other even when the surface roughness Ra and Rz are less than the surface roughness Ra and Rz in the case (1).

(3) When the anode current collector 32 is electrolytic iron foil, and a surface thereof is Ni-plated, the surface roughness Ra of the anode current collector 32 is 0.55 μm to 0.75 μm, and the surface roughness Rz thereof shall be 5 μm to 8 μm. In this case, the surface roughness of the anode current collector 32 within the above range can improve the adhesiveness between the anode current collector 32 and the anode mixture layer 31 even at a low press pressure.

In some embodiments, the average grain area of the anode current collector 32 is at least 3.0 $\mu m^2$, at least 4.0 $\mu m^2$, or at least 5.0 $\mu m^2$, in any cases (1) to (3). The average grain area less than 3.0 $\mu m^2$ may lead to insufficient adhesiveness. It is noted that annealing the electrolytic iron foil results in a significantly large average grain area, so that the adhesiveness is easy to be secured even at a relatively low press pressure. In some embodiments, in view of handling the electrolytic iron foil, the average grain area is at most 1000 $\mu m^2$, at most 800 $\mu m^2$, or at most 600 $\mu m^2$.

Here, values that are measured conforming to JIS B0601: 2013 are used for the surface roughness Ra and Rz. A value that is measured conforming to JIS Z2241 (Metallic materials-Tensile testing-Method) is used for the elongation percentage. Martens hardness that is measured conforming to ISO 14577 is used for the surface hardness. A value that is obtained from a cross-sectional observation image of the electrolytic iron foil, conforming to JIS G0551: 2013 is used for the average grain area.

Such an anode current collector 32 may be manufactured as follows. That is, the electrolytic iron foil may be obtained by preparing a Ti material as a support for forming the electrolytic iron foil, cleaning the Ti material in pretreatment such as pickling and washing, and thereafter electrodepositing iron on a surface thereof.

In some embodiments, electrodeposition is carried out using a plating bath containing 800 to 1000 g/L of iron chloride tetrahydrate and 20 to 40 g/L of hydrochloric acid under the conditions of 80 to 110° C. in temperature, at most 1.0 in pH, and 5 to 15 A/$dm^2$ in current density.

In the plating bath, too small an amount of iron chloride tetrahydrate leads to low deposition efficiency, and too large an amount thereof makes bath control difficult. The bath may contain other additives. It is noted that deposition using the plating bath containing any metallic element other than iron leads to a small grain size, and as a result, leads to the hard resultant, which may lead to insufficient adhesiveness. Alternatively, anomalous deposition may make it impossible to obtain the foil. Therefore, in some embodiments, the content of other additives is limited to such an extent that the obtained electrolytic iron foil is at least 99.9% pure iron.

The current density within the above range in the above composition of the plating bath makes it possible to obtain electrolytic iron foil having sufficient adhesiveness to the anode mixture layer 31 even at a high press pressure when the sulfide all-solid-state battery 100 is manufactured. The current density more than 15 A/$dm^2$ leads to too hard electrolytic iron foil, that is, too high surface hardness of the anode current collector 32, which may result in insufficient adhesiveness to the anode mixture layer 31. The current density in a low range as in the above range leads to a tendency for the elongation percentage to be high, and further, to a tendency for the surface roughness to be high. In some embodiments, in view of improving the adhesiveness more, the current density is more 5 to 10 A/$dm^2$.

For the purpose of improving the adhesiveness of the anode current collector 32, the electrolytic iron foil may be subjected to heat treatment. The heat treatment conditions are not limited. For example, in some embodiments, the heat treatment is performed for 1 to 6 hours in a vacuum atmosphere at 600 to 800° C. Performing the heat treatment under the conditions of the above ranges makes it easy to obtain the surface hardness 1090 to 2050, which can improve the adhesiveness to the anode mixture layer 31. The heat treatment at less than 600° C. makes it difficult to obtain a softening effect. The heat treatment at more than 800° C. leads to too softened electrolytic iron foil that may be easily teared off.

In some embodiments, in the Ni-plating, pretreatment of pickling and washing on the surface of the electrolytic iron foil, thereafter to form a Ni-electroplated layer thereon, and to form a Ni roughening plated layer thereon.

In some embodiments, the Ni-plated layer having a coating weight within a range of 1.0 to 13.5 g/$m^2$ is formed under the plating conditions for forming the Ni-electroplated layer which are, for example, 50 to 65° C. in temperature, 4 to 6 in pH, and 5 to 30 A/$dm^2$ in electrolytic current density, using a plating bath containing 200 to 350 g/L of Ni sulfate hexahydrate, 10 to 60 g/L of Ni chloride hexahydrate, and 10 to 50 g/L of boric acid. When the surface of the obtained electrolytic iron foil is successively Ni-plated without drying, the pretreatment is not always necessary. The coating weight less than 1.0 g/$m^2$ may lead to insufficient content resistance, and an insufficient primary rust resistance function during transportation and storage. The coating weight more than 13.5 g/$m^2$ causes a relatively hard layer to be thick on the surface, which may lead to insufficient adhesiveness to the anode mixture layer 31.

In some embodiments, the Ni roughening plated layer having a coating weight within a range of 9.0 to 45.0 g/$m^2$ is formed under the plating conditions for forming the Ni roughening plated layer which are, for example, 35 to 45° C. in bath temperature, 2.2 to 4.5 in pH, and 10 to 50 A/$dm^2$ in electrolytic current density, using a plating bath containing 5 to 35 g/L of Ni sulfate hexahydrate, 10 g/L of ammonium sulfate, and 10 g/L of ammonium citrate. Ni sulfate hexahydrate less than 5 g/L causes plating defects, which may make it difficult to form the Ni roughening plated layer; and Ni sulfate hexahydrate more than 35 g/L makes roughening difficult (makes the deposition state near the normal to enhance the leveling effect, so that uneven deposition is not formed. The electrolytic current density less than 10 A/$dm^2$ also makes roughening difficult (makes the deposition state near the normal to enhance the leveling effect, so that uneven deposition is not formed); and the electrolytic current density more than 50 A/$dm^2$ causes plating defects to make it difficult to form the Ni roughening plated layer itself. Further, the coating weight less than 9.0 g/$m^2$ leads to insufficient roughening, to affect improvement of the adhesiveness to the anode mixture layer 31 merely a little. The coating weight more than 45 g/$m^2$ leads to poor productivity and high costs.

Forming such a Ni roughening plated layer can make the surface roughness of the metal foil high, to improve the adhesiveness to the anode mixture layer 31. The coating weights of the Ni-plated layer and the Ni roughening plated layer may be measured by a known measurement method such as measurement using, for example, an X-ray fluorescence system.

A known method may be used as the method of manufacturing the anode layer 30. For example, the anode layer 30 may be manufactured by using the same method as that for the above described cathode layer 10.

(Sulfide all-Solid-State Battery 100)

The sulfide all-solid-state battery may be made by, for example, layering the cathode layer 10, the sulfide solid electrolyte layer 20 and the anode layer 30 in this order, and pressing them. The made sulfide all-solid-state battery 100 may be sealed into a predetermined battery case or the like. At that time, terminals etc. necessary for the battery may be connected. In some embodiments, the sulfide all-solid-state battery 100 is used as a lithium secondary battery.

Examples

Hereinafter the sulfide all-solid-state battery according to the present disclosure will be described using Examples.

<Making battery for Evaluation>

(Making Cathode Layer)

A cathode active material ($Li_{1.15}Ni_{1/3}Co_{1/3}Mn_{1/3}W_{0.005}O_2$) was coated with $LiNbO_3$ in the atmosphere environment using a tumbling fluidized coating machine (manufactured by Powrex Corporation), to be fired in the atmosphere environment.

Next, into a vessel made from PP (polypropylene), butyl butyrate, a butyl butyrate solution of a 5 wt % PVdF-based binder (manufactured by Kureha Corporation), a sulfide solid electrolyte ($Li_2S$—$P_2S_5$ based glass ceramics containing LiI and LiBr, mean particle diameter: 0.8 μm), and a conductive additive (VGCF manufactured by Showa Denko K.K.) were added, and the resultant was stirred with an ultrasonic dispersive device (UH-50 manufactured by SMT Corporation) for 30 seconds. Next, the vessel was shaken with a mixer (TTM-1 manufactured by Sibata Scientific Technology Ltd.) for 3 minutes, and the resultant was further stirred with the ultrasonic dispersive device for 30 seconds. After the vessel was shaken with the mixer for 3 minutes, the above described cathode active material was added thereinto, and ultrasonic dispersion and shaking were performed twice under the same conditions. Here, the mixing ratio of each material was such that cathode active material:sulfide-solidelectrolyte:binder:conductive additive=88:10:0.7:1.3 (wt %). At last, Al foil (manufactured by Nippon Foil Manufacturing) was coated with the resultant using an applicator according to a blade method. After air-dried, the resultant was dried on a hot plate at 100° C. for 30 minutes. Then, a cathode layer was obtained.

(Making Sulfide Solid Electrolyte Layer)

Into a vessel made from PP, heptane, a heptane solution of a 5 wt % BR-based binder (manufactured by JSR Corporation), and a sulfide solid electrolyte ($Li_2S$—$P_2S_5$ based glass ceramics containing LiI and LiBr, mean particle diameter: 0.8 μm) were added, and the resultant was stirred in an ultrasonic dispersive device (UH-50 manufactured by SMT Corporation) for 30 seconds. The mixing ratio of each material was such that sulfide solid electrolyte: binder=99.5: 0.5 (wt %). Next, the vessel was shaken with a mixer (TTM-1 manufactured by Sibata Scientific Technology Ltd.) for 30 minutes, and the resultant was further stirred with the ultrasonic dispersive device for 30 seconds. After the vessel was shaken with the mixer for 3 minutes, Al foil was coated with the resultant using an applicator according to a blade method. A coating slurry was air-dried up, and thereafter dried up on a hot plate at 100° C. for 30 minutes. Then, a sulfide solid electrolyte layer was obtained.

(Making Anode Layer)

Into a vessel made from PP, butyl butyrate, a butyl butyrate solution of a 5 wt % PVdF-based binder (manufactured by Kureha Corporation), a sulfide solid electrolyte ($Li_2S$—$P_2S_5$ based glass ceramics containing LiI and LiBr, mean particle diameter: 0.8 μm), and a conductive additive (VGCF manufactured by Showa Denko K.K.) were added, and the resultant was stirred with an ultrasonic dispersive device (UH-50 manufactured by SMT Corporation) for 30 seconds. Next, the vessel was shaken with a mixer (TTM-1 manufactured by Sibata Scientific Technology Ltd.) for 30 minutes, and the resultant was further stirred with the ultrasonic dispersive device for 30 seconds. After the vessel was shaken with the mixer for 3 minutes, an anode active material (silicon manufactured by Elkem) was added thereinto, and ultrasonic dispersion and shaking were performed twice under the same conditions. Here, the mixing ratio of each material was such that anode active material:sulfidesolidelectrolyte:binder:conductive additive=63:30:2:5 (wt %). At last, the electrolytic iron foil or Ni-plated electrolytic iron foil in Table 1 was coated with the resultant using an applicator according to a blade method. After air-dried, the resultant was dried on a hot plate at 100° C. for 30 minutes. Then, an anode layer was obtained.

(Roll Pressing Electrode Layers)

The cathode layer and the sulfide solid electrolyte layer were each cut out to 2 cm×7 cm, and the cathode mixture layer was stuck to the sulfide solid electrolyte layer in such a manner as to face the sulfide solid electrolyte layer. The resultant was roll-pressed at a pressure of 100 kN at a temperature of 150° C. in the longitudinal direction as sandwiched between SUS foil.

The anode layer and the sulfide solid electrolyte layer were each cut out to 2 cm×7 cm, and the anode mixture layer was stuck to the sulfide solid electrolyte layer in such a manner as to face the sulfide solid electrolyte layer. The resultant was roll-pressed at the pressure of Table 1 at a temperature of 150° C. in the longitudinal direction as sandwiched between SUS foil. At this time, the adhesiveness between the anode mixture layer and the anode current collector after the roll pressing was visually evaluated. The case of no separation by the pressing was indicated by "o", the case of partial separation was indicated by "A", and the case of separation all over the faces was indicated by "x". The results are shown in Table 1.

(Layering Electrode Layers)

The anode layer after the roll pressing was punched out to be a circle of 1.08. $cm^2$. The sulfide solid electrolyte layer punched out to be a circle of 1.08 $cm^2$ was superposed on the structure of the anode mixture layer/the sulfide solid electrolyte layer, to be pressed at 1 ton/$cm^2$, and the Al foil on the electrolyte layer side was separated. Next, the structure of the cathode mixture layer/the sulfide solid electrolyte layer was punched out to be circles of 1 $cm^2$, and pressed together with the foregoing resultant at 3 ton/$cm^2$. Then, a battery was made. The made battery was held by an aluminum laminate. Evaluation was carried out using the laminated cell as a battery for evaluation.

<Surface Roughness Ra and Rz>

The surface roughness Ra and Rz of the anode current collector used in the battery for evaluation were measured. The results are shown in Table 1. The measurement method was conforming to JIS B0601: 2013. Specifically, a surface of the anode current collector was scanned using a laser microscope (manufactured by Olympus Corporation, model number: OLS3500) under the conditions of 97 μm (length)× 129 μm (width) in an observed field, 100 in observation magnification (objective lens MPLAPO 100×408, lens magnification: ×100, optical zoom: ×1), and 129 μm in the width of a measured field. The surface roughness Ra and Rz were measured by analyzing the obtained image using analysis software (name of the software: LEXT-OLS, analysis mode: linear roughness analysis). Here, no cut-off value was set in the measurement, and the average of N=5 was defined as the measured value.

<Elongation Percentage>

The elongation percentage of the anode current collector used in the battery for evaluation was measured. The results are shown in Table 1. The measurement method was conforming to JIS Z2241 (Metallic materials-Tensile testing-Method). Specifically, a metal specimen was obtained by punching out a metal piece of a No. 4 dumbbell of JIS K6251 by an SD lever type sample cutting machine (manufactured by Dumbbell Co., Ltd., model: SDL-200) using a cutter conforming to JIS K6251 (model: SDK-400). The obtained metal specimen was subjected to a tensile test conforming to JIS Z 2241. The tensile test was carried out using a tensile tester (Universal Material Testing Instrument TENSILON RTC-1350A manufactured by ORIENTEC CORPORATION) under the conditions of 10 mm/min in tensile rate at room temperature. The elongation percentage was calculated from (stroke distance of the tensile tester)/(original gauge length)×100, and the average of N=3 was defined as the measured value.

<Surface Hardness>

The surface hardness (Martens hardness) of the anode current collector used in the battery for evaluation was measured. The results are shown in Table 1. The measurement method was conforming to ISO14577. Specifically, the surface hardness (Martens hardness) was measured by applying a load onto the surface of the anode current collector under the condition that the load by a triangular pyramid indenter was 1 mN, using a Nanoindentation Tester (model number: ENT-1100a manufactured by ELIONIX INC.). The measured value was the mean value of any ten points.

<Average Grain Area>

Figure 2:
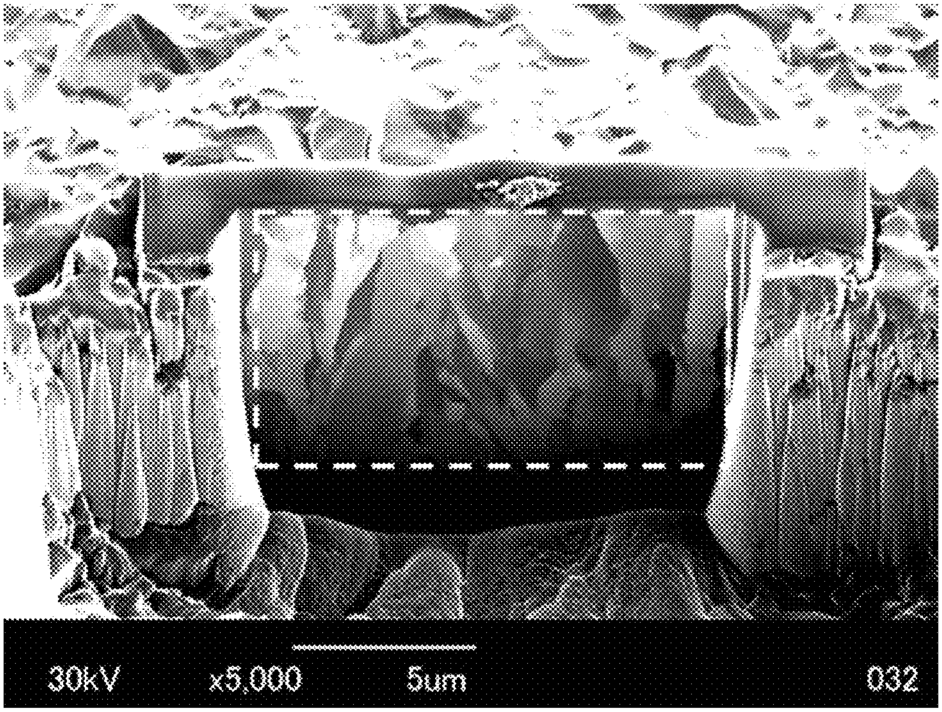
FIG. 2 is a cross-sectional observation image of an anode current collector of Example 1.

The average grain areas of the anode current collectors of Examples 1 to 5 among the anode current collectors used in the batteries for evaluation were measured. The results are shown in Table 1. The measurement method was conforming to JIS G0551: 2013. Specifically, the average grain area was calculated from a cross-sectional observation image of the electrolytic iron foil, using the following formula. FIG. 2 shows a cross-sectional image of Example 1 as an example. The range surrounded by the dotted line in FIG. 2 is an analysis target field. The number of the grains present in this field was counted, and then the average grain area was calculated.

Average grain area=area of the analysis target field/the number of grains in the field Area of the analysis target field=thickness of the electrolytic iron foil(μm)×10 μm(width)

<Internal Resistance>

Only the internal resistance of the batteries made by roll pressing at 100 kN was measured among the batteries for evaluation of Examples 1 to 6, which were made as described above. The measurement method was as follows. The internal resistance of the battery was measured by keeping the battery for evaluation at 25° C., adjusting the SOC to 3.77 V, and passing a 7C current for 10 seconds. The results are shown in Table 1. Table 1 shows the results based on Example 1 as the internal resistance of Example 1 is indexed as 100.

other examples even by pressing at 50 kN. From this result, it is considered that the elongation percentage of 5 to 12% leads to more powerful adhesiveness. This is presumed to be because the increased elongation percentage led to a small difference in elongation between the anode mixture layer and the anode current collector in the pressing, which led to difficulty in separation. Further, the internal resistance largely lowered in Examples 3 and 4, compared with Examples 1 and 2. From this result, it is considered that the surface hardness of the anode current collector of 1090-2050 led to more powerful adhesiveness, and lowered internal resistance. It is presumed that in Examples 3 and 4, the surface hardness was low and thus the collector was softer compared with Examples 1 and 2, so that bite of the anode current collector into the anode mixture layer became easier, to increase the contact area, which led to lowered internal resistance.

From the results of Examples 7 and 8, it can be confirmed that the surface hardness of the anode current collector of 1090 to 2050 even when the surface roughness thereof was low compared to Examples 3 and 4 led to good adhesiveness.

In contrast, when the Ni-plated electrolytic iron foil was used as the anode current collector, it can be confirmed from the results of Examples 5 and 6 and Comparative Example 3 that the surface roughness Ra of the anode current collector of 0.55 μm to 0.75 μm and the surface roughness Rz thereof of 5 μm to 8 μm led to good adhesiveness at any press pressure.

Further, the relationship between the average grain area and the internal resistance was examined. There is a tendency that the larger the average grain area was, the lower

TABLE 1

| | anode current collector | | | | | | adhesiveness under pressing | | |
|---|---|---|---|---|---|---|---|---|---|
| | material | elongation percentage (%) | surface hardness (Martens hardness) | surface roughness Ra (μm) | surface roughness Rz (μm) | average grain area (μm2) | 100 kN (50 kN/cm) | 50 kN (25 kN/cm) | internal resistance |
| Example 1 | electrolytic iron foil | 3 | 2870 | 0.4 | 3 | 3.84 | ○ | △ | 100 |
| Example 2 | electrolytic iron foil | 12 | 2820 | 0.6 | 6 | 4.16 | ○ | ○ | 99 |
| Example 3 | electrolytic iron foil | 7 | 2050 | 0.4 | 3 | 5.56 | ○ | ○ | 92 |
| Example 4 | electrolytic iron foil | 5 | 1090 | 0.2 | 2 | 301.9 | ○ | ○ | 93 |
| Exa:mple 5 | Ni-plated electrolytic iron foil | 5 | 3590 | 0.55 | 5 | 1.51 | ○ | ○ | 112 |
| Example 6 | Ni-plated electrolytic iron foil | 5 | 3590 | 0.75 | 8 | — | ○ | ○ | 105 |
| Example 7 | electrolytic iron foil | 7 | 2050 | 0.09 | 1 | — | ○ | △ | — |
| Example 8 | electrolytic iron foil | 5 | 1090 | 0.08 | 1 | — | ○ | ○ | — |
| Comparative Example 1 | electrolytic iron foil | 3 | 2870 | 0.09 | 1.1 | — | x | x | — |
| Comparative Example 2 | electrolytic iron foil | 12 | 2820 | 0.09 | 1.1 | — | △ | △ | — |
| Comparative Example 3 | Ni-plated electrolytic iron foil | 5 | 3590 | 0.4 | 3.5 | — | x | x | — |

<Results>

When Examples 1 to 4 and Comparative Examples 1 and 2 are compared, it can be confirmed in Examples 1 to 4 that the anode mixture layer and the anode current collector adhered to each other by pressing at 100 kN, but in Comparative Examples 1 and 2, partial separation or separation all over the faces is confirmed. From this result, it is considered that the surface roughness Ra of the anode current collector of 0.2 μm to 0.6 μm and the surface roughness Rz thereof of 2 μm to 6 μm result in the anode current collector and the anode mixture layer adhering to each other. Among Examples 1 to 4, it can be confirmed that the anode mixture layer and the anode current collector adhered to each other in Examples 2 to 4 more than in the the internal resistance was. From this, it is considered that a larger average grain area improved the adhesiveness more. It is noted that from the results of Examples 3 and 4, any average grain area of at least 5.0 $\mu m^2$ led to the same result of the internal resistance, and there is not much difference found in the adhesiveness.

REFERENCE SIGNS LIST cathode layer
11 cathode mixture layer
12 cathode current collector
20 sulfide solid electrolyte layer
30 anode layer
31 anode mixture layer

32 anode current collector

100 sulfide all-solid-state battery

What is claimed is:

1. A sulfide all-solid-state battery comprising:

a cathode layer;

an anode layer; and a sulfide solid electrolyte layer disposed between the cathode layer and the anode layer, wherein the anode layer has an anode mixture layer, and an anode current collector on a face of the anode mixture layer, the face being on an opposite side of the sulfide solid electrolyte layer, the anode current collector is an electrolytic iron foil that does not substantially contain other elements, the anode current collector has surface roughness Ra of 0.2 μm to 0.6 μm, and surface roughness Rz of 2 μm to 6 μm, and the anode current collector has surface Martens hardness of 1090 $N/mm^2$ to 2820 $N/mm^2$.

2. The sulfide all-solid-state battery according to claim 1, wherein an elongation percentage of the anode current collector is 5% to 12%.

3. The sulfide all-solid-state battery according to claim 1, wherein the anode current collector has surface Martens hardness of 1090 $N/mm^2$_to 2050 N/mm·

* * * * *